United States Patent [19]
Boyce et al.

[11] Patent Number: 6,141,059
[45] Date of Patent: Oct. 31, 2000

[54] METHOD AND APPARATUS FOR PROCESSING PREVIOUSLY ENCODED VIDEO DATA INVOLVING DATA RE-ENCODING.

[75] Inventors: Jill MacDonald Boyce, Manalapan, N.J.; Larry Pearlstein, Newton, Pa.; Frank Anton Lane, Medford Lakes, N.J.

[73] Assignee: Hitachi America, Ltd., Tarrytown, N.Y.

[21] Appl. No.: 09/179,074

[22] Filed: Oct. 26, 1998

Related U.S. Application Data

[60] Division of application No. 08/468,147, Jun. 6, 1995, Pat. No. 5,828,421, which is a continuation-in-part of application No. 08/320,481, Oct. 11, 1994, Pat. No. 5,614,952, which is a continuation-in-part of application No. 08/339,436, Nov. 14, 1994, Pat. No. 5,635,985, and a continuation-in-part of application No. 08/424,686, Apr. 18, 1995, Pat. No. 5,598,222.

[51] Int. Cl.[7] .................................................. H04N 5/272
[52] U.S. Cl. ........................................ 348/565; 375/240.26
[58] Field of Search ...................................... 348/400–410, 348/565, 15; 382/232, 233, 244–246; 358/426, 261.1, 261.3, 427; 386/68, 109, 111; 375/24.26

[56] References Cited

U.S. PATENT DOCUMENTS

| | | | |
|---|---|---|---|
| 4,238,773 | 12/1980 | Tsuboka et al. | 358/183 |
| 4,665,438 | 5/1987 | Miron et al. | 358/183 |
| 4,931,879 | 6/1990 | Koga et al. | 358/335 |
| 5,016,106 | 5/1991 | Yong-Je et al. | 358/183 |
| 5,091,785 | 2/1992 | Canfield | 358/183 |
| 5,206,714 | 4/1993 | Kim | 358/22 |
| 5,208,660 | 5/1993 | Yoshida | 358/22 |
| 5,237,460 | 8/1993 | Miller et al. | 360/8 |
| 5,313,303 | 5/1994 | Ersoz et al. | 348/439 |
| 5,335,117 | 8/1994 | Park et al. | 360/48 |
| 5,367,318 | 11/1994 | Beaudin et al. | 345/201 |
| 5,386,241 | 1/1995 | Park | 348/565 |
| 5,390,052 | 2/1995 | Kato et al. | 360/32 |
| 5,398,072 | 3/1995 | Auld | 348/426 |
| 5,408,270 | 4/1995 | Lim | 348/429 |
| 5,422,677 | 6/1995 | Do | 348/568 |
| 5,467,144 | 11/1995 | Saeger et al. | 348/566 |
| 5,477,397 | 12/1995 | Naimpally et al. | 360/10.3 |
| 5,537,440 | 7/1996 | Eyuboglu | 348/405 |
| 5,587,806 | 12/1996 | Yamada et al. | 386/68 |
| 5,832,128 | 11/1998 | Suzuki | 382/246 |
| 5,887,110 | 3/1999 | Sakamoto et al. | 386/68 |

OTHER PUBLICATIONS

A. Hoffman, B. Macq, J.J. Quisquater; "New Technologies and New Services, Future Prospects of the Cable TV Networks", pp. 17–20 (date unknown).

*Primary Examiner*—Howard W. Britton
*Attorney, Agent, or Firm*—Straub & Pokotylo; Michael P. Straub

[57] ABSTRACT

An implementation efficient video decoder suitable for use as a picture in picture decoder is described. In one embodiment, the video decoder receives primary and secondary bitstreams with the secondary bitstream including the video data intended to be displayed as inset pictures. The decoder uses many of the same circuit components on a time shared basis to decode both the main and inset pictures reducing the amount of circuitry required to implement the decoder. In one embodiment a preparser discards the majority of DCT coefficients in the secondary bitstream and the remaining data is variable length decoded and then variable length encoded using a non-MPEG compliant coding scheme prior to storing the inset picture data in a coded data buffer. Re-encoding of the selected inset picture data in this manner greatly reduces data storage requirements and simplifies the circuitry required to subsequently decode the inset picture data. To reduce frame memory requirements inset picture data is downsampled, stored and then upsampled prior to display thereby reducing inset picture frame memory buffer requirements.

22 Claims, 8 Drawing Sheets

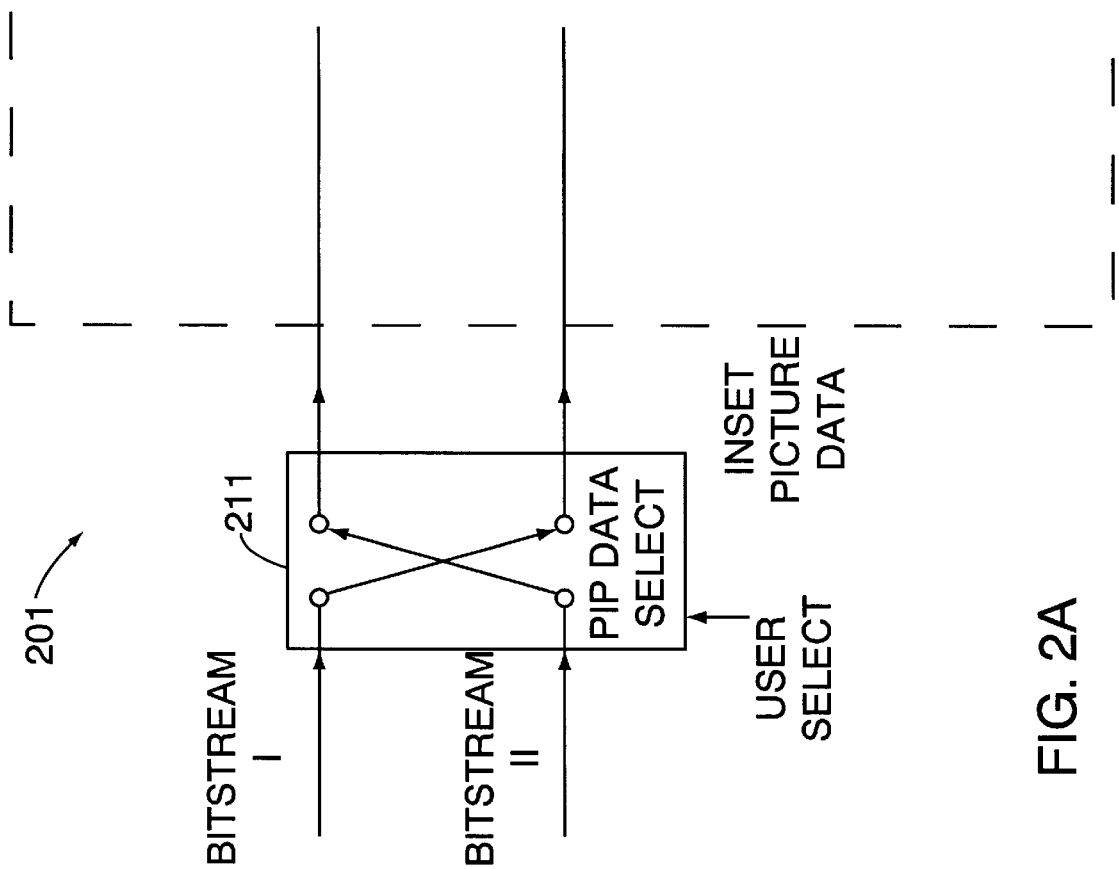

METHOD AND APPARATUS FOR PROCESSING PREVIOUSLY ENCODED VIDEO DATA INVOLVING DATA RE-ENCODING.

RELATED APPLICATIONS

This application is a divisional of U.S. patent application Ser. No. 08/468,147, filed Jun. 6, 1995 which is scheduled to issue as U.S. Pat. No. 5,828,421, which is a continuation-in-part of U.S. patent application Ser. No. 08/320,481, filed Oct. 11, 1994 which issued as U.S. Pat. No. 5,614,952; a continuation-in-part of U.S. patent application Ser. No. 08/339,436 filed Nov. 14, 1994 which issued as U.S. Pat. No. 5,635,985 and a continuation-in-part of patent application Ser. No. 08/424,686 filed Apr. 18, 1995 which issued as U.S. Pat. No. 5,598,222.

FIELD OF THE INVENTION

The present invention is directed to video decoders and, more particularly, to methods and apparatus for implementing video decoders that are capable of decoding digital video bitstreams to provide, e.g., picture-in-picture capability.

BACKGROUND OF THE INVENTION

The use of digital, as opposed to analog signals, for television broadcasts and the transmission of other types of video and audio signals has been proposed as a way of allowing improved picture quality and more efficient use of spectral bandwidth over that currently possible using analog NTSC television signals.

The International Standards Organization has set a standard for video data compression for generating a compressed digital data stream that is expected to be used for digital television. This standard is referred to as the ISO MPEG (International Standards Organization—Moving Picture Experts Group) ("MPEG") standard. In accordance with the MPEG standard, video data is encoded using discrete cosine transform encoding and is arranged into variable length encoded data packets for transmission.

Generally, digital television signals can be either standard definition signals having a resolution approximately that of current NTSC television, or high definition television signals which have a resolution that is greater that of current NTSC television signals.

One version of the MPEG standard, MPEG-2, is described in the International Standards Organization—Moving Picture Experts Group, Recommendations H.222.0 and H.262, ISO/IEC 13818-1 and 13818-2, respectively, titled "Information Technology—Generic Coding Of Moving Pictures and Associated Audio" (hereinafter "the November 1994 ISO-MPEG Committee International Standards") hereby expressly incorporated by reference. Any references made in this patent application to MPEG video data is to be understood to refer to video data that complies with MPEG-2 standards as defined in the November 1994 ISO-MPEG Committee International Standards unless otherwise indicated.

Picture-in-picture capability has become a widely accepted and often desired feature of modern analog televisions. To meet anticipated demand for picture-in-picture capability in digital televisions, it will be necessary for a digital television, e.g., an MPEG-2 compatible television, to decode video data representing two pictures. The two pictures can then be displayed as a picture within a picture to achieve the desired picture-in-picture effect.

In known analog picture-in-picture systems, during picture-in-picture operation, a first full resolution decoder is normally used to decode the TV signal used to produce a main picture and a second full resolution decoder is used to decode the television signal which is used to provide the second, e.g., inset, picture displayed within a small area of the main picture. Thus, in current analog systems a complete additional tuner and decoder is normally used to provide picture-in-picture capability. The picture-in-picture capability featured by current analog televisions typically produces an inset picture whose size is approximately ¼×¼ to ⅓×⅓ of the full size display.

The cost of providing two full resolution digital video decoders and, in particular, the memory required to implement two such decoders, in the case of digital video signals is likely to be significant.

In order to achieve customer acceptance in home video systems, it is desirable that the cost associated with adding picture-in-picture capability to a digital television set be minimized.

Accordingly, there is a need for methods and apparatus that can be used to provide picture-in-picture capability in, e.g., video decoding and display devices such as digital television sets, at a minimal cost.

SUMMARY OF THE PRESENT INVENTION

The present invention is generally directed to video decoders and, in various embodiments, to methods and apparatus for efficiently implementing video decoders for, e.g., decoding two or more video bitstreams to provide, e.g., picture-in-picture capability.

In one embodiment of the present invention a video decoder receives a primary and a secondary bitstream with the secondary bitstream including video data intended to be displayed as inset pictures. The primary and secondary pictures are decoded using many of the same decoder circuit components, on a time shared basis, to decode both the primary picture and the secondary or inset picture.

In one embodiment of the present invention, a preparser is used to discard all but a selected subset of the DCT coefficients in the secondary bitstream thereby reducing the amount of data that is used to represent the inset pictures and the amount of inset picture data needed to be decoded.

By significantly reducing the amount of data used to represent the inset pictures, time sharing of the decoder circuitry is facilitated. For example, if enough inset picture data is discarded to permit decoding in, e.g., ¼ the time required to decode the main picture, by operating the main picture decoding circuitry approximately 25% faster, the much of the main picture decoder circuitry can be used to decode the inset pictures thereby avoiding the need for two complete decoders operating in parallel.

In one embodiment, the data selected by the preparser to be used for the inset pictures is variable length decoded and then re-encoded using a non-MPEG compliant coding scheme that allows for the more efficient coding of the limited amount of data used to represent inset pictures and which also facilities subsequent decoding. By re-encoding the data selected for use as inset picture data prior to storage in a coded data buffer memory requirements are reduced.

In yet another embodiment of the present invention, inset picture data is downsampled prior to storage in a frame buffer and then upsampled after storage to correspond to the size the inset picture will ultimately be displayed at. By downsampling and then upsampling prior to display in this manner frame buffer memory requirements are reduced.

Numerous other features and advantages of the present invention are discussed in the detailed description that follows.

BRIEF DESCRIPTION OF THE DRAWINGS

FIG. 3 illustrates an 8×8 block of DCT coefficients with specific DCT coefficients set to zero in accordance with one embodiment of the present invention.

DETAILED DESCRIPTION

The present invention is directed to video decoders and, more particularly to video decoders for, e.g., decoding two or more video bitstreams to provide, e.g., picture-in-picture capability.

Figure 1:
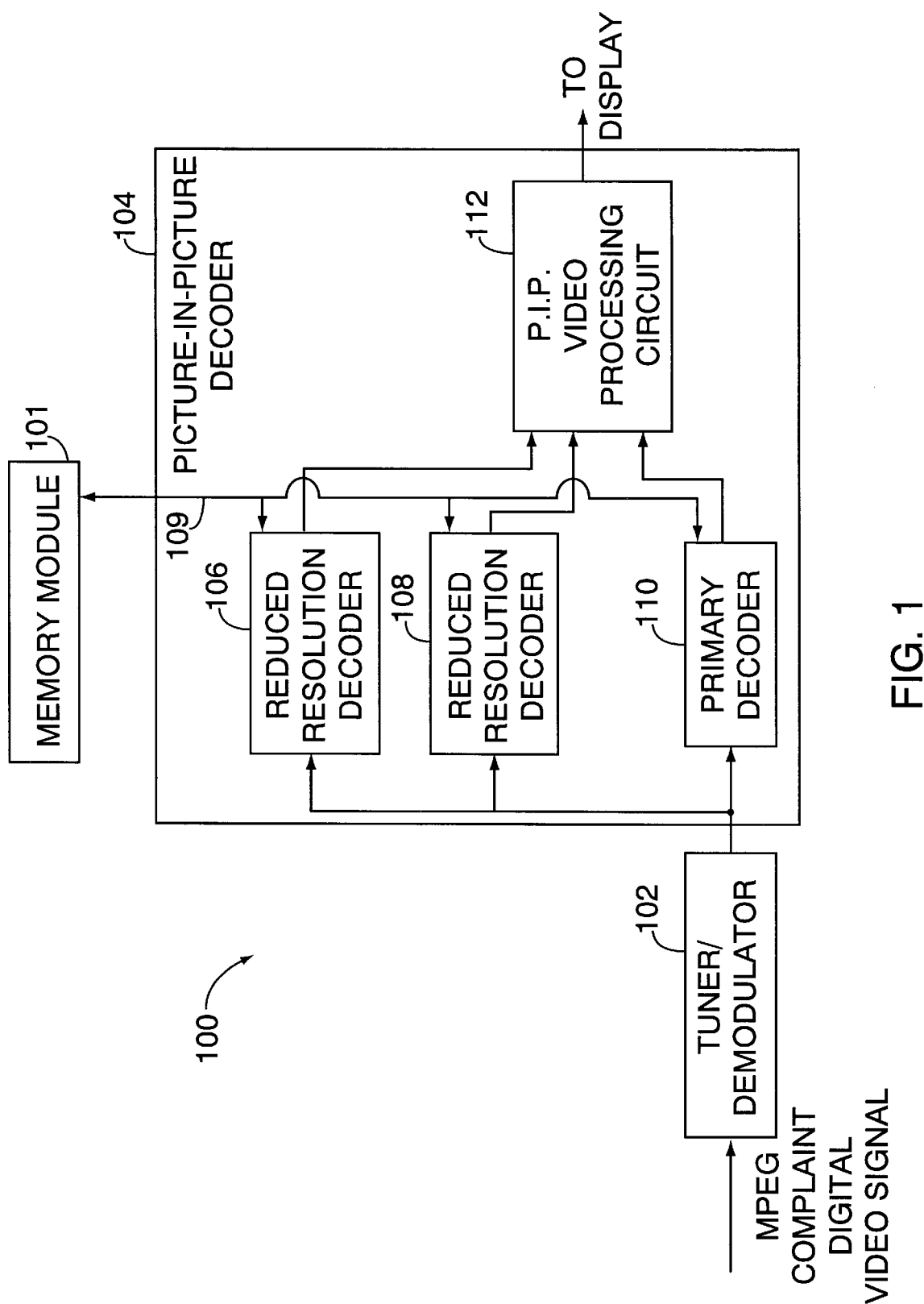
FIG. 1 illustrates an exemplary circuit for decoding video images to support picture-in-picture television operation in accordance with one embodiment of the present invention.

Referring now to FIG. 1, there is illustrated a picture-in-picture ("P-I-P") tuner/decoder circuit implemented in accordance with the present invention generally indicated by the reference number 100. The P-I-P tuner/decoder circuit 100 comprises a tuner/demodulator circuit 102, a P-I-P decoder 104, and a memory module 101.

The P-I-P decoder 104 receives MPEG compliant demodulated digital video data, e.g., either SD or HD TV signals from the tuner/demodulator 102. The received video data is supplied to the input of a primary, e.g., full resolution decoder 110 and to the input of one or more reduced resolution decoders, i.e., the first and second reduced resolution decoders 106, 108. The primary decoder 110 receives the main picture data while each of the secondary decoders 106, 108 receives inset picture data.

The primary decoder 110 is responsible for decoding the main picture of a picture-in-picture image while the first and second decoders 106, 108 are responsible for generating separate images which will be displayed as inset pictures in a small area of the main picture. In the embodiment illustrated in FIG. 1, a separate reduced resolution decoder 106, 108 is used for each additional image that is to be displayed in addition to the main picture while a common memory module 101 is coupled to and used by each of the decoders 106, 108, 110 of the P-I-P decoder 104.

The output of the primary decoder 110 and the reduced resolution decoders 106, 108 is coupled to the input of a picture-in-picture video processing circuit 112 which operates to combine the main picture with the reduced resolution pictures output by the reduced resolution decoders 106, 108 prior to the display of the resulting combined picture.

As illustrated in FIG. 1 and as discussed in U.S. patent application Ser. No. 08/424,686, titled "METHOD AND APPARATUS FOR DECODING MULTIPLE VIDEO BITSTREAMS USING A COMMON MEMORY" which is hereby expressly incorporated by reference, the reduced resolution decoders 106, 108 and primary decoder 110 can be implemented using the single common memory module 101 thereby avoiding the need to provide separate memory units to serve as the decoder and frame buffers of each of the decoder circuits 106, 108, 110 of the P-I-P decoder 104.

In such a common memory embodiment, the primary and secondary decoder circuits 106, 108, 110 can be implemented on the same chip, i.e., as a single integrated circuit with, e.g., a single off-chip memory unit serving as the common memory module 101. Distinct circuitry for the primary and secondary decoders 110, 106, 108 may be included on the single chip. Such an embodiment avoids the need to use multiple chips to implement the primary and secondary decoder circuits 106, 108, 110.

Sharing of a common memory module 101 by multiple decoders can place considerable demands on the bandwidth of a bus 109 used to couple the decoders 106, 108, 110 to the common memory module 101. In order to reduce bus bandwidth requirements a preparser such as that described in U.S. patent application Ser. No. 08/339,436 can be used in conjunction with the primary decoder 110 as well as the reduced resolution decoders 106, 108. In such an embodiment, the preparser associated with the primary decoder 110 is used to reduce the data rate of the main picture bitstream where the bus bandwidth would otherwise be exceeded absent such data reduction. It is desirable that such data reduction operations only occur during a small portion of the time, e.g., during worst case data scenarios.

In addition, or as an alternative to the use of a preparser in conjunction with the primary or main picture data, prediction operations can be limited to one-directional as opposed to bi-directional prediction to reduce or eliminate excessive data throughput demands on the data bus coupling the decoders and main memory. In particular, one-directional predication can be performed in some or all cases where pictures in the main or inset picture bitstreams were encoded using bi-directional interpolative prediction, e.g., in the case of B- pictures.

Accordingly, when multiple decoders 106, 108, 110 share a common memory module 101 it is possible to reduce peak memory access demands using one or both of the above described techniques.

By using one or more reduced resolution decoder circuits 106, 108 and a common memory module 101, P-I-P capability can be provided at less cost than providing P-I-P capability through the use of multiple full resolution decoders.

As will be discussed further below, additional cost savings can be achieved by time sharing various components of a P-I-P decoder so that the time shared components serve as part of both a low resolution decoder and a full resolution decoder. Additional cost saving features, as will be described below, may also be incorporated into a P-I-P decoder, in accordance with the present invention, to reduce the complexity of individual components of a P-I-P decoder and the memory requirements associated therewith.

In addition, preparsing combined with variable length decoding, and then re-encoding using a custom VLC table which is smaller than a standard MPEG-2 compliant code table, can be used to reduce inset picture data channel buffer requirements and subsequent decoding circuitry complexity. The combination of a decoding and re-encoding step with the pre-parsing operation can be used when separate reduced resolution decoders 104, 106 are used in conjunction with a full resolution decoder 110 or when the operation of a reduced resolution decoder is merged with the operation of a full resolution decoder as illustrated in the embodiment of FIG. 2.

Because the circuitry used to decode a reduced resolution picture used as an inset picture is similar to that used to decode an MP@ML signal or a MP@HL signal, it is possible to implement a picture-in-picture decoder circuit that uses a great deal of circuitry that is shared between a primary, e.g., full resolution, decoder and a secondary, e.g., reduced resolution, decoder. In such a shared circuitry embodiment, the common decoder circuitry is time shared between decoding the main picture and the inset picture. In, such an embodiment, e.g., the embodiment illustrated in FIG. 2, a P-I-P decoder circuit 200 is capable of decoding the main picture in less than a frame time. The inset picture is decoded in the portion of a frame time that is not used to decode the main picture.

Figure 2B:
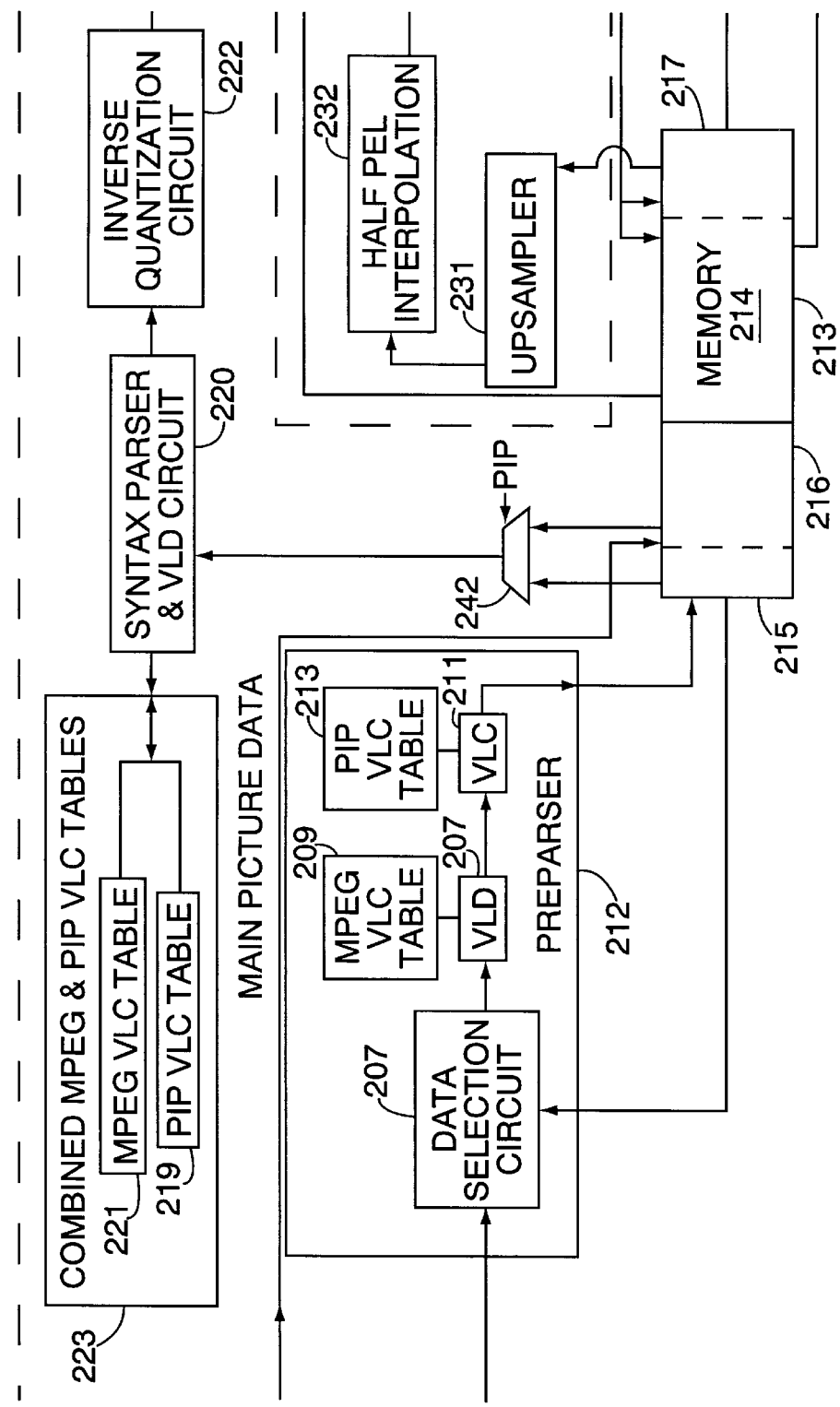
FIG. 2, which comprises the combination of FIGS. 2A, 2B and 2C, is a block diagram of a P-I-P decoder implemented in accordance with another embodiment of the present invention.
Figure 2C:
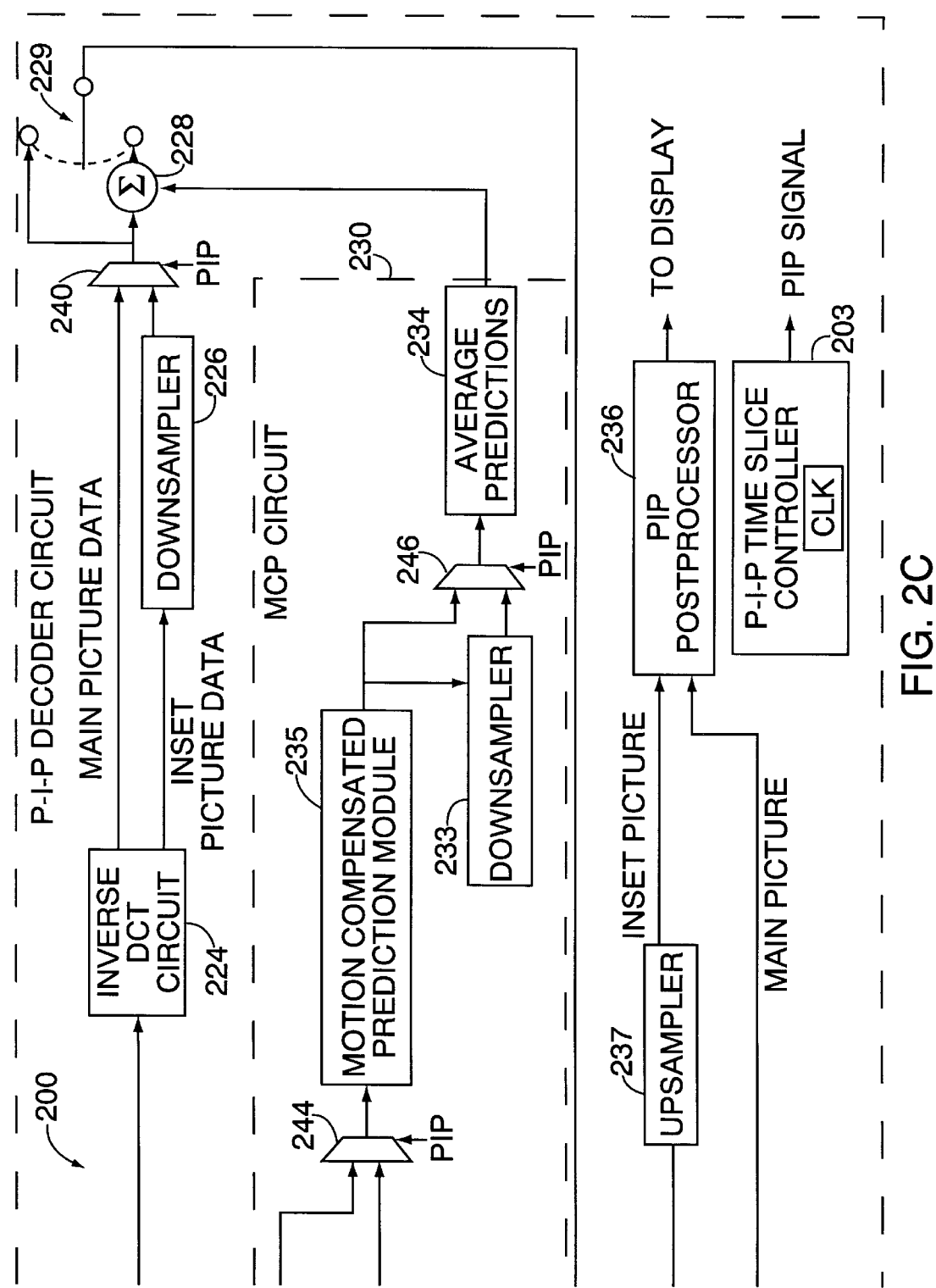

Referring now to FIG. 2, which comprises the combination of FIGS. 2A, 2B and 2C, there is illustrated a video circuit 201 including a P-I-P decoder circuit 200 and a P-I-P data select switch 211 implemented in accordance with one embodiment of the present invention. The P-I-P data select switch 211 receives as input signals first and second bitstreams representing distinct video signals from, e.g., one or more tuner/demodulator circuits 102. The data select switch 211 is responsive to a user select signal to control which of the first and second bitstreams is supplied to the P-I-P decoder circuit 200 as the main picture data and which bitstream is supplied as the inset picture data. In a first position, the switch 211 feeds the first and second bitstreams to the main picture and inset picture data terminals, respectively. In a second position illustrated in FIG. 2, the data select switch 211 supplies the second bitstream to the main picture data terminal and the first bitstream to the inset picture data terminal, respectively.

The P-I-P decoder circuit 200 comprises a preparser 212, a memory unit 214, a syntax parser and variable length decoder ("VLD") circuit 220, a combined MPEG and PIP VLC look-up table 219, an inverse quantization circuit 222, an inverse DCT circuit 224, a first downsampler 226, a summer 228, a switch 229, an upsampler 237, a PIP postprocessor circuit 236 and a motion compensated prediction circuit 230.

Generally, each of the above described circuits may be implemented with circuits that are the same as or similar to like named circuit components of the video decoder illustrated in U.S. patent application Ser. No. 08/339,436 titled Methods And Apparatus For Implementing A Low Cost Joint HD/SD Television Decoder which is hereby expressly incorporated by reference. It should be noted however, that components, e.g., the syntax parser & VLD circuit 220, inverse quantization circuit 222, inverse DCT circuit 224, MCP circuit 530 and memory 224 may need to operate slightly faster in the P-I-P decoder circuit 200 than when used to decode a single set of picture data since both the main picture and inset picture must be decoded during the same time period normally used to decode only the main picture.

In addition to the above described components, the P-I-P decoder circuit 200 of the present invention includes a PIP time slice controller 203 and a series of first through fourth multiplexers ("MUXes") 242, 240, 244, 246, respectively, which are individually controlled by a PIP signal output by the PIP time slice controller 201.

The PIP decoder circuit 200 operates to decode both the main picture data and inset picture data received from the PIP data select circuit 211. As will be described below, the MUXes 242, 240, 244 and 246 can be used to control the routing of inset and main picture data so that many of the components of the P-I-P decoder circuit 200 are used for decoding both the main picture data and inset picture data thereby reducing the need for additional circuitry as compared to when two separate decoders are used to provide picture-in-picture capability.

As illustrated in FIG. 2, the main picture data is supplied to a main picture coded data or channel buffer portion 216 of the common memory unit 514. In order to reduce memory and other processing requirements, the inset picture is supplied to the preparser 212 before being stored in an inset picture coded data buffer portion 215 of the common memory unit 514. The preparser 212, in some embodiments, receives a feedback signal from the common memory unit 514 regarding the status or fullness of the inset picture coded data buffer 215 and adjusts the amount of data reduction performed on the inset picture bitstream as a function of this feedback information.

With regard to MPEG-2 bitstreams, the MPEG-2 maximum number of data bits transmitted per MB of bandwidth (bits/MB) is the same for Main Profile at Main Level (MP@ML) used for, e.g., a standard definition television signal, and Main Profile at High Level (MP@HL), used for, e.g., a HDTV signal. However, the number of MB's of data to be processed per unit time is lower for MP@ML than it is for MP@HL, and hence processing time per MB for MP@ML is longer. Accordingly, the coded data buffer, e.g., channel buffer, and syntax parser and VLD circuit used for processing an MP@ML bitstream are generally cheaper than the same circuits for an MP@HL decoder. When, a preparser is used, as described in patent application Ser. No. 08/339, 436 to reduce the processing requirements for decoding an HDTV signal to approximately that of a SDTV signal, the data rate and thus the resolution, of a received HDTV signal is reduced to approximate that of an SDTV signal thereby reducing the cost of the decoder circuitry required to process the received HDTV signal. The same techniques used to limit the amount of data used to represent an HDTV signal can also be used, as in the embodiment of FIG. 2, to reduce the amount of data required to represent an inset picture.

Thus, by using the preparser 212 in the P-I-P decoder circuit 200 it is possible to reduce the processing rates required to decode the inset picture data. This can be achieved, as in the case of the HDTV picture case, by limiting the maximum number of bits per received MB of data and/or the number of DCT coefficients per MB or received data. Because the inset picture of a P-I-P display is likely to be viewed at a distance of relatively more picture heights than the main picture, greater data reduction can be performed on the inset picture data than can be performed on a HDTV picture that is being used as a main picture, while maintaining acceptable inset picture quality.

In one embodiment the preparser 212 operates to discard run-length/amplitude (DCT) coefficients corresponding to a block of video data after a certain preselected position or a position that is determined as a function of the fullness of the coded data buffer in order to reduce the data rate. In the P-I-P embodiment illustrated in FIG. 2, the preparser 212 discards the majority of DCT coefficients corresponding to each block of video data thereby achieving a substantial reduction in the inset picture data rate. Accordingly, the pre-parser 212 operates to insure that a large subset of the 64 DCT coefficient locations associated with an 8×8 block of video data will always be set to zero as a result of the preparsing operation. Referring now briefly to FIG. 3, there is illustrated an 8×8 block of DCT coefficients wherein all but four of the 64 DCT coefficients are set to zero.

Thus, the preparser 212 is used in one embodiment to limit the number of non-zero DCT coefficients per block of an inset picture, e.g., to a 2×2 region represented by the first four received DCT coefficients or to, e.g., four of the first 5 DCT coefficients when the DCT coefficients are coded in scan order (one extra coefficient is needed to insure that the four coefficients in the upper left hand corner of an 8×8 block are maintained when the DCT coefficients are received in zig-zag scan order). When the preparser limits the DCT coefficients in such a manner, the subsequent memory requirements and VLD circuit requirements associated with decoding the inset picture data can be reduced by taking advantage of the fact that the VLD circuit and memory unit will never be given an inset picture video block having a variable length codeword exceeding a preselected runlength controlled by the preparser 112, e.g., of 4, which is less than the MPEG maximum run-length of 64.

In accordance with the present invention, in one embodiment, the preparser 212 does not only discard DCT coefficients corresponding to a block of video data but it also variable length decodes the original MPEG compliant video data and then re-encodes the selected subset of data used to represent inset pictures using a custom, i.e., non-MPEG-2 compliant, amplitude/runlength VLC table.

As illustrated in FIG. 2, rather than simply parse and discard data, the preparser 212 includes a variable length decoder ("VLDI") circuit 207 for receiving and decoding, through the use of a MPEG variable length code table 209, coupled thereto, the selected subset of inset picture data. The selected subset of inset picture data is then supplied to a variable length encoder ("VLC") circuit 211 which is responsible for encoding the selected inset picture data, e.g., the first four DCT coefficients of each block of video data. In accordance with the present invention the VLC circuit 211 does not encode the inset picture data in an MPEG-2 compliant form. Instead, the VLC circuit 211 encodes the data using a P-I-P table 213 of run-length amplitude values which is considerably smaller than an MPEG-2 compliant table. In particular, the P-I-P table 213 includes less than the full 64 possible run length values required for MPEG-2 compliance and contains, e.g., 16 or less values.

Thus, in one embodiment, the preparser 212 uses a data selection circuit to parse and then selectively discard sole of the received inset picture data to significantly reduce the amount of data used to represent received pictures. The selected data is then re-encoded. As discussed above, by using the preparser 212 to parse and discard the majority of the received inset picture data prior to storage in the inset picture coded data buffer 215, buffer memory and subsequent data processing requirements are substantially reduced. Re-encoding of the selected data further reduce data storage memory requirements.

By so limiting the DCT coefficients and re-encoding them, the subsequent VLD operation associated with the inset picture is greatly simplified and inset picture memory storage requirements are reduced. The subsequent inset picture VLD circuitry can be made cheaper than would otherwise be possible since the inset picture data will never include a variable length codeword corresponding to a run-length that exceeds the preselected run-length determined by the data selection and re-encoding operation. As discussed above, by using custom amplitude run-length values in the P-I-P VLC table 213, having, e.g., amplitude run-lengths of less than 16, or, in one embodiment, 4 or less, the maximum length codeword size associated with an inset picture and the average codeword size is greatly reduced. In accordance with the present invention, wherein a VLC circuit 211 in the pre-parser 212 is matched to a VLD circuit 220, used for subsequently decoding inset picture data, the VLC and VLD circuits 211, 220 may use coefficient coding schemes other than run-length/amplitudes for inset picture data. For example, it is possible to code in amplitude form only, and in a limited preselected region or range.

The non-MPEG compliant VLC tables 213, 219 used to encode and decode inset picture data, in accordance with the present invention, provide for the simplification of P-I-P inset picture decoder circuity, as compared to an MP@ML decoder, particularly in the variable length decoder/syntax parser area because a custom PIP VLC table in accordance with the present invention has far fewer entries than a full MPEG VLC table.

Accordingly, the use of a preparser 212 and a custom VLC table 213, 219 as described above for inset picture data, permits the implementation of a P-I-P decoder, e.g., a reduced resolution decoder, in a manner that is much cheaper to implement than an MP@ML decoder. While the preparser 212 of a P-I-P decoder must still be capable of parsing the full MPEG-2 VLC table, it can do so at a lower rate than an MP@ML decoder because it has to decode only a subset of the originally received inset picture data. In addition, by re-encoding the selected inset picture data the subsequent syntax parser/VLD circuit used to process the inset picture data need not parse a full MPEG-2 VLC table but only the smaller custom table. In addition, because most of the DCT coefficients are set to zero or are to be treated as zero, the IDCT and IQ functions required to decode the inset picture data can be implemented using far less circuitry, or in less time with the same amount of given resources, than required for an MP@ML decoder which is designed to process all 64 DCT coefficients of each block of video data.

Because post pre-parser decoding operations are relatively simple in the case of inset picture data processed by a preparser 212 which includes a VLC circuit 211, in the above described manner, a general purpose computer or digital signal processor chip under the control of software may be used to perform post pre-parser inset picture decoding operations. Because of the time requirements associated with real time decoding, it is expected that the pre-parser 212 will, in most cases, be implemented in dedicated hardware even when a general purpose computer under the control of software is used to implement the remaining inset picture data decoding functions.

Referring once again to FIG. 2, the operation of the P-I-P decoder circuit 200 will now be described in greater detail.

As discussed above, main picture data is stored in the main picture coded data buffer portion 216 of the memory unit 214 while the inset picture data output by the preparser 212 is stored in the inset picture coded data buffer portion 215 of the memory unit 214. Coded main picture and coded inset picture data outputs of the memory unit 214 are coupled via the first MUX 242 to an input of the syntax parser and VLD circuit 220. The first MUX 242 is responsive to the PIP signal generated by the PIP time slice controller 203 to first output coded main picture data and then inset picture data. In this manner, the inset picture data is supplied to the syntax parser and VLD circuit 220 as it concludes processing the data representing a main picture which is to be displayed in combination with the inset picture represented by the inset picture data.

The PIP time slice controller 203 is synchronized with received video data and is responsible for the generation of the PIP signal which, in one embodiment, is used to synchronize the processing of main and inset picture data so that both a main and inset picture is decoded during each respective frame time.

In one exemplary embodiment the PIP time slice controller is generated as a function of the time required to process a portion of the macroblocks of a main picture and a portion of the macroblocks of an inset picture.

The time permitted for decoding the macroblocks of the main picture and inset picture is, on average, approximately the time allocated to display the macroblocks of the main picture which are being decoded. Assuming that Trow1 is the time allocated to display a row of macroblocks of the main picture, $$Trow1 = 1/(MBV1 * fr1)$$

where

MBV1 is the number of vertical main picture macroblocks, and fr1 is the main picture data frame rate.

In one embodiment, 0.8*Trow1 is the duration of the individual periods of time allocated for main picture data decoding operations and 0.2*Trow1 is the duration of the individual periods allocated for inset picture data decoding operations. In such an embodiment, the PIP signal is asserted during each interval of Trow1 time to divide the period Trow1 into a first portion used to decode one row of macroblocks of main picture data and a second portion used to decode N2 macroblocks of inset picture data, e.g., at the end of a 0.8*Trow1 time period, and at the end of each Trow1 time period where:

$$N2 = ceil(Trow1 * R2) = ceil((MBV2/MBV1) * fr2/fr1) * MBH2)$$

and where ceil(x) produces the smallest integer that is greater than or equal to x;

MBV2 is the number of vertical inset picture macroblocks per frame;

MBH2 is the number of horizontal inset picture macroblocks per frame;

R2 is the rate of processing macroblocks for the inset picture and R2=MBV2*MBH2*fr2; and fr2 is the frame rate of the inset picture data.

In such an exemplary embodiment, the assertion of the PIP signal causes the decoder circuits receiving the PIP signal to switch between a main picture data processing mode and an inset picture data processing mode.

In accordance with one embodiment of the present invention, the syntax parser and VLD circuit 220 is coupled to a combined MPEG and PIP VLc table 223 which includes an MPEG VLC table 221 and the PIP VLC table 219. MPEG code data stored in the table is used to variable length decode the main picture data while the custom PIP VLC table data is used to decode the inset picture data which was encoded by the preparser 212.

The output of the syntax parser and VLD circuit 220 is coupled to the input of the inverse quantization ("IQ") circuit 222 which, in turn, is coupled to the inverse DCT ("IDCT") circuit 224.

While the IQ circuit 222 performs inverse quantization on all 64 DCT coefficients representing a main picture, it need only process a small subset of the 64 possible DCT coefficients, e.g., the DCT coefficients which correspond to the upper left 2×2 or 3×3 block of DCT coefficients, in the case of the inset picture. It should be noted that the IQ and IDCT circuits 222 and 224 may process a smaller set of non-zero DCT coefficients than those selected by the preparser 212. This is because the ultimate set of DCT coefficients which are maintained by the IQ and IDCT circuits 222, 224 for further processing may not be easily obtainable by simply comparing the DCT coefficient index in scan order to a threshold as may be done by the preparser 212 to initially select a set of DCT coefficients to be retained as the inset picture data.

In the illustrated embodiment, the IDCT circuit 224 outputs the main picture data separately from the inset picture data. As illustrated the main picture data is supplied directly to the first input of the second MUX 240 while the inset picture data is downsampled by the downsampler 226 to reduce inset picture frame buffer memory requirements prior to being supplied to the second input of the MUX 240.

Figure 4A:
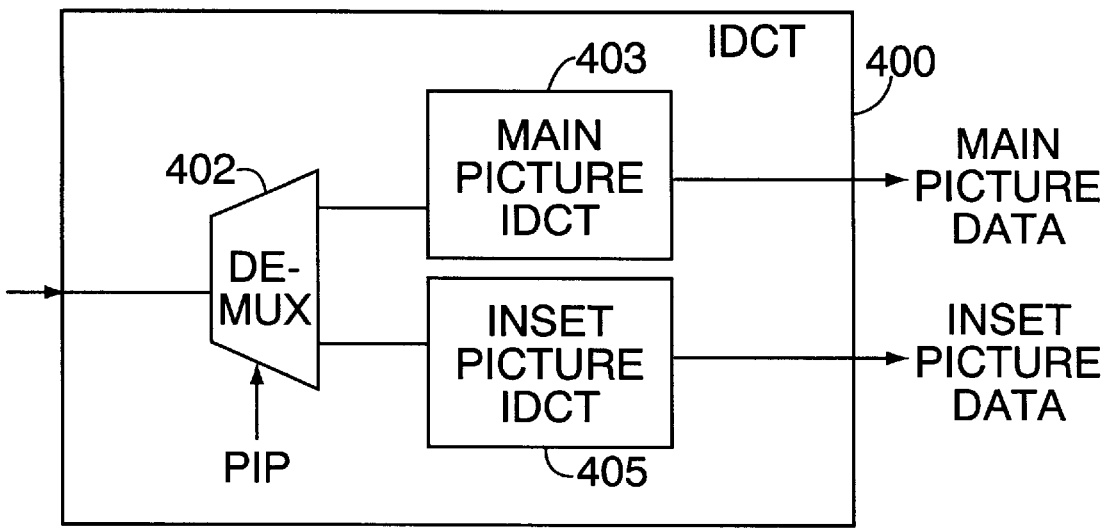
FIGS. 4A and 4B illustrate inverse discrete cosine transform ("IDCT") circuits of the present invention suitable for use in a P-I-P decoder.

Referring now briefly to FIG. 4A, there is illustrated an IDCT circuit 400 implemented in accordance with a first embodiment of the present invention, suitable for use as the IDCT circuit 224 of FIG. 3. As illustrated the IDCT circuit 224 comprises a demultiplexer 402 for receiving the data output by the inverse quantization circuit 222 and the PIP signal output by the PIP time slice controller 203. The demultiplexer 402 is responsive to the PIP signal to route the main picture data to the main picture IDCT circuit 403 and to route the inset picture data to the inset picture IDCT 405. In this manner, the main picture and inset picture data is processed by the IDCT circuit 400 using two distinct IDCT circuits. Because of the discarding of most of the DCT coefficients from the original inset picture data, it is possible to use a much simpler IDCT circuit 405 to process the inset picture data than is required to process the main picture data.

Figure 4B:
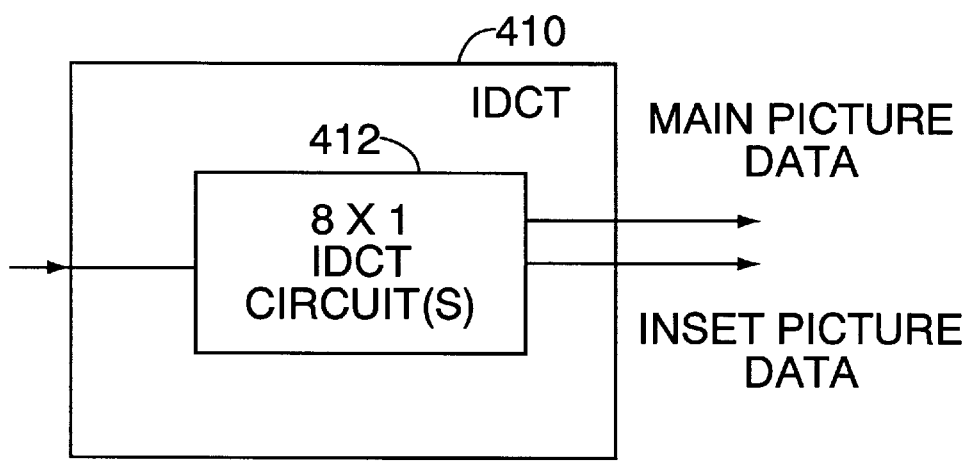

Referring now to FIG. 4B there is illustrated an IDCT circuit 410, implemented in accordance with another embodiment of the present invention that is also suitable for use as the IDCT circuit 224 of FIG. 3. In the embodiment illustrated in FIG. 4B, the main picture and inset picture data are processed using the same IDCT circuitry. As illustrated, in the embodiment of FIG. 4B, this circuitry comprises a series of individual 8×1 IDCT circuits 412. The individual 8×1 IDCT circuits are used first to compute the IDCT for the main picture data by operating on, e.g., the 8 rows and 8 columns of the main picture block of coefficients and then are reused to compute the IDCT for the inset picture data.

Generally, in accordance with the separability property discussed in detail in U.S. patent application Ser. No. 08/339,436, by using one or more 8×1 IDCT circuits as an IDCT unit, and by operating the IDCT circuit(s) at a rate faster than the minimum rate required to process the main picture data, e.g., at a rate which results in the main picture data being processed in less time than is used to display the main picture data, there will be time left before or after processing the main picture data in which all or some of the 8×1 IDCT circuits used to process the main picture data can be used perform an IDCT operation on inset picture data. Thus, by operating the IDCT unit at, e.g., a 25% faster rate than required to process only main picture data, one can reuse the same IDCT circuitry to process inset picture data.

In accordance with the present invention, in one embodiment, when processing the inset picture data, a reduced complexity (relative to the complexity of the main picture IDCT circuit) IDCT circuit is implemented by taking into account the knowledge that many of the 64 input coefficients will be zero as a result of, e.g., the preparsing operation.

Figure 5:
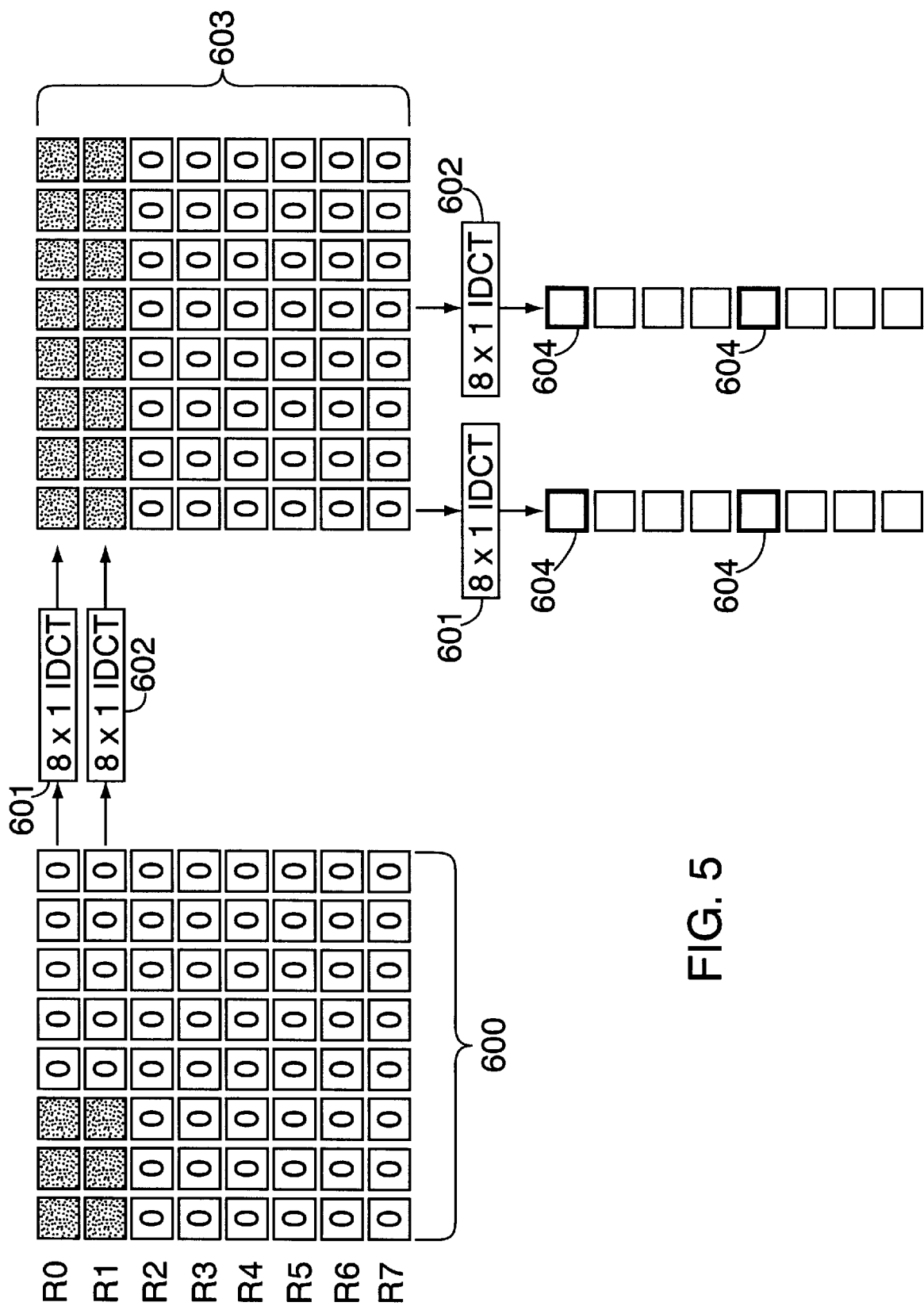
FIGS. 5 and 6 illustrate various methods of the present invention for performing IDCT operations on a block of inset picture DCT coefficients.

Referring now to FIG. 5, there is illustrated an example of performing an IDCT operation on an block of inset picture coefficients 600 using first and second 8×1 IDCT circuits 601, 602 of an IDCT unit. It is to be understood that while two IDCT circuits 601, 602 are illustrated a single IDCT circuit could be used to perform both IDCT operations.

Assume that the 2-D IDCT for the inset picture data is computed using the separability property and that it is desired to preserve $n_r$ non-zero rows and $n_c$ non-zero columns. If $n_r < n_c$ then, in accordance with the present invention, $n_r$ of 8×1 IDCT operations are used to first compute the 8×1 IDCTs for each of the $n_r$ rows. These IDCTs can be designed to take advantage of the fact that at most $n_c$ of each row's coefficients will be non-zero. After computing the IDCTs for the rows, the 8 column IDCTs are generated using the results generated by calculating the 8×1 IDCTs for the $n_r$ rows.

FIG. 5 illustrates an example of performing an IDCT operation on a block of inset picture coefficients, in accordance with this embodiment of the present invention, $n_r=2$ and $n_c=3$. In FIG. 5, the shaded areas show coefficient values of interest, while the pixel values that will be retained after downsampling are generally indicated by the reference numeral 604. Block 603 represents intermediate. IDCT calculation results. As illustrated in the example of FIG. 5, the same 8×1 IDCT circuits 601, 602 are used to perform both the row and column IDCT operations.

Figure 6:
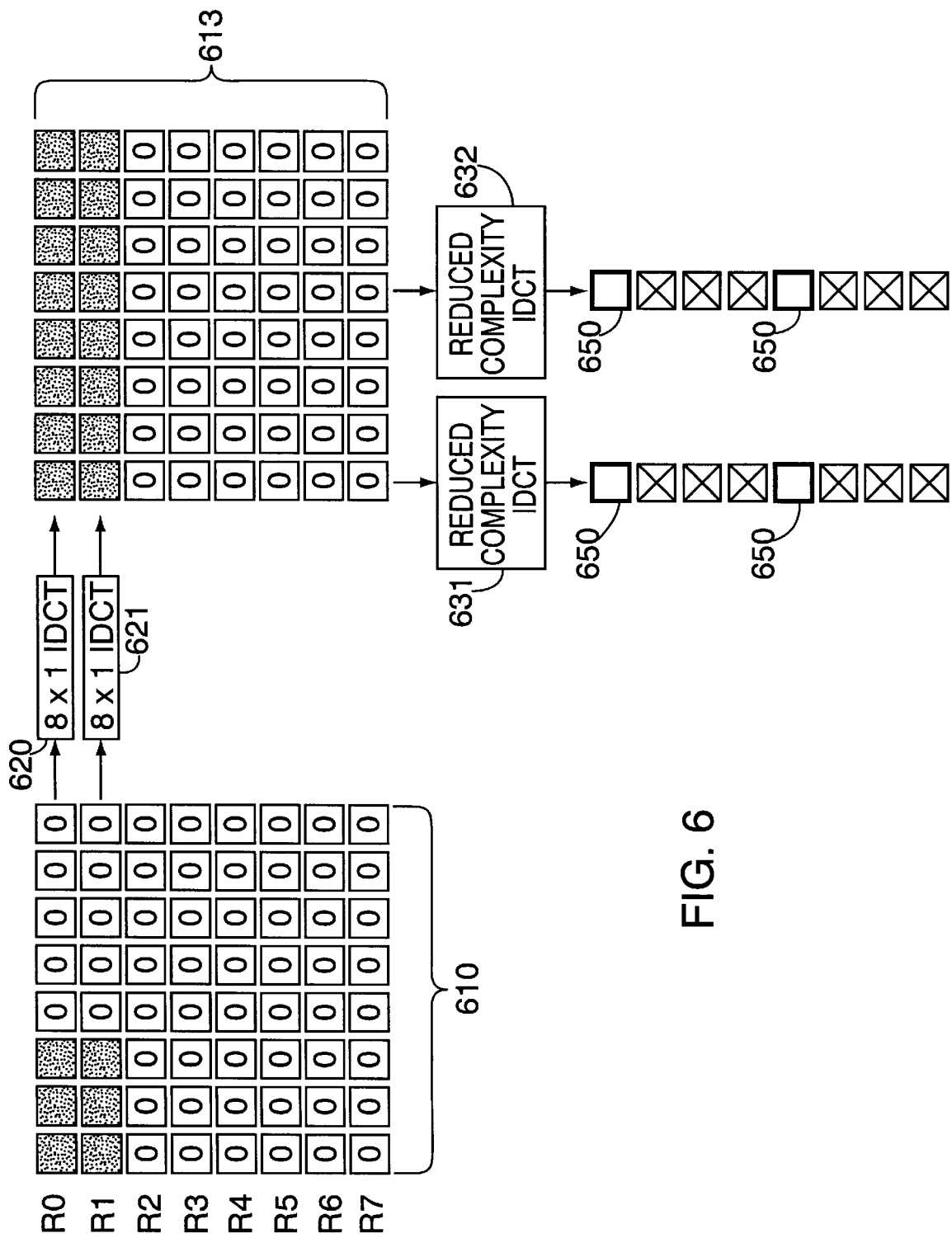

If decimation, e.g. downsampling, is to be performed on the inset picture data immediately after the IDCT operation, as in the embodiment illustrated in FIGS. 2 and 6, it is possible to save inset picture IDCT computational resources by computing only the subset of the 8 column IDCTs that will be retained, and only compute the output points in each column that will be retained.

One procedure for when $n_r > n_c$ is to interchange row and column operations in the procedure described above for when $n_c < n_r$. When $n_r = n_c$ it is generally not important, in terms of efficiency, whether or not the row IDCTs are processed before the column IDCTs or vice versa.

As illustrated in FIG. 6, in the case a block of DCT coefficients has been downsampled by a factor of 4 both vertically and horizontally, an IDCT operation may be performed on a block of DCT coefficients 610 using first and second 8×1 DCT circuits 620, 621 to perform the row IDCT operations and then using reduced complexity IDCT circuits, e.g., the reduced complexity circuits 631, 632, on the intermediate results 613, to compute only the subset of 8 column IDCTs that will be retained, e.g, the values represented by the bold blocks 650. In this embodiment, a reduced complexity IDCT circuit 631, 632, is a circuit which calculates fewer than the maximum number of possible output values and which takes advantage of the fact that all but a preselected number of the values used to perform the IDCT operation will be zero. For example, in the embodiment of FIG. 6, the reduced complexity IDCT circuits 631, 632 compute only two output values each and take advantage of the fact that all but the first two input values are always zero.

Generally, the set of non-zero DCT coefficients processed by the IDCT circuit 224 as the inset picture data will be the same or a subset of the coefficients retained by the preparser 212. However, as discussed above, the set of DCT coefficients processed by the IDCT circuit 224 as the inset picture data may be smaller than the set of DCT coefficients selected by the preparser 212 because selecting coefficients according to the scan pattern order, as may be done by the preparser 212, may not produce the minimal number of coefficients desired for processing by the IDCT circuit 224, e.g., a 2×2 or 2×3 block of the upper left DCT coefficients of a block of 8×8 DCT coefficients.

Referring once again to FIG. 2, the output of the second MUX 540 is coupled to a first input of the summer 228.

When the PIP signal indicates that the main picture data is to be processed, the first input of the MUX 240 is coupled to the first input of the summer and to a first input of the switch 129. However, when the PIP signal indicates that the inset picture data is to be processed, the second input of the MUX 240 is coupled to the first input of the summer 228 and the first input of the switch 129.

A second input of the summer 228 is coupled to the output of the MCP circuit 230 which supplies motion compensation information to the summer 128 to be combined with received P- and B- frames. The video data output by the summer 228 represents a video frame that has been processed using motion compensation data to include the relevant video information from preceding and/or subsequent anchor frames. The main picture data or inset picture data supplied to the first input of the summer 228, on the other hand, represents either fully decoded picture data or decoded prediction residuals in the cases of intraframe coded macroblocks and non-interframe coded macroblocks, respectively. The switch 129 is controlled, in accordance with known techniques, to selectively coupled the output of the MUX 240 to the inputs of frame memory portions 213, 217 of the memory unit 214 when the received video data was not encoded using motion compensated predication, e.g., when the video data output by the MUX 240 is intra-frame coded. However, when the video data output by the MUX 240 is inter-frame coded data, e.g., data such as B- frame data or P- frame data that was encoded using, e.g., motion compensated predication, the output of the summer 228 is coupled by the switch 229 to the inputs of frame memory portions 213, 217 of the memory unit 214.

When the data output by the switch 229 is main picture data, it is stored in the main picture frame memory portion 213 of the memory unit 214. However, when it is inset picture data, it is stored in the inset picture frame memory portion 217 of the memory unit 214.

The MCP circuit 230 comprises an upsampler 231, a third MUX 244, a motion compensated prediction module 235, a downsampler 233, a fourth MUX 546 and an average predictions circuit 534 which are coupled together as illustrated in FIG. 2. The PIP signal is used to control the routing of the data through the MUX's 244, 246 such that upsampling and downsampling is performed only on the previously downsampled inset picture data read out of the inset picture frame memory portion 517 and not the data read out of the main picture frame memory portion 213 of the memory unit 514.

As with various other components of the P-I-P decoder circuit 200, the motion compensated prediction module 235, which is responsible for performing half-pel interpolation, and the average predictions circuit 234, are time shared. Thus, the circuits 235, 234 are used to process both the main picture data and the inset picture data with the PIP time slice controller 203 determining via control of the MUXes 244, 246 what data is processed during any given time interval.

The inset and main picture frames which are intended to be displayed together are output by the inset and main picture frame memory portions 217, 213 of the memory unit 214 and supplied to the upsampler 237 and a main picture input of the PIP post-processor 237, respectively. The inset picture data received by the upsampler 237 is upsampled to correspond to a picture the size of the inset picture window that is provided within the main picture. In the illustrated embodiment, the upsampled inset picture data is then supplied to the PIP post-processor 236 which combines the main picture data and inset picture data so that the inset picture will be displayed within the main picture. The video signal generated by the PIP post-processor 236 is supplied to a display device such as a monitor for display.

Generally, one would normally allocate a specific amount of memory for storing data corresponding to each pixel that will be used in the ultimate display of a picture. For example, for a 720×480 picture, if the memory size used to store picture data is reduced by ¼×¼ which corresponds to a picture of 180×120 pixels, it would be natural for the inset picture to also be reduced in size to 180×120 pixels.

Better looking video can be achieved if more pixels are used in the reduced memory and then downsampling is done afterwards, immediately before display thereby avoiding some residual effects of the earlier downsampling and storage of the picture data. This is true since it is the reduced memory storage requirement that causes much of the reduced picture quality associated with storage of a downsampled image since information present in the original picture is lost when a downsampled picture is stored.

In reality, absent storage constraints best looking output video for a reduce size display is achieved in accordance with the present invention by decoding the inset picture at full resolution without the use of a pre-parser, storing the decoded full resolution inset picture in memory and then downsampling to the reduced display size just prior to supplying the inset picture to the PIP post-processor 236. Good results can be achieved by performing the same steps in conjunction with the use of a preparser to reduce decoding processing requirements.

In such embodiments because the inset picture is stored at full resolution, the upsampler and downsampler circuits 231 and 233 of the MCP circuit 230 can be eliminated.

However, decoders which use such approaches, where an inset picture is stored as a full resolution picture, are more costly to implement than decoders which downsample an inset picture to correspond to the ultimate display size prior to storage, in terms of memory and decoder processing requirements.

In one embodiment of the present invention, downsampled inset pictures are stored in the frame buffer using an amount of memory that directly corresponds to the ultimate display size of the inset picture but which is less than the amount of memory required to store a full resolution inset picture. In such an embodiment, the upsampler 237 is not used.

Even more memory savings can be achieved if a reduced size memory is used for the inset picture frame memory that is disproportionately smaller than a full size memory than the inset picture size is smaller than the main picture. In such an embodiment, as illustrated in FIG. 2, the inset picture data is upsampled after storage in the frame buffer 217 and prior to display. Image quality is likely to be worse in this case then when inset pictures are stored using more memory. However, in PIP applications, the smaller inset picture is going to be viewed at relatively more picture heights away than the main picture, so the quality of the inset picture is less important. For example, in accordance with this embodiment of the present invention, a reduced size memory of ¼×¼ size (i.e., a memory ¹⁄₁₆ the size of the memory used to store a full resolution frame), or 180×120 pixels can be used with the stored frame being upsampled to a ⅓ by ⅓ size or 240×160 pixels prior to being displayed. In this example, using the smaller size memory provides a 44% savings in memory as compared to if the inset picture were stored at a ⅓×⅓ size.

Simulations have been performed by processing MPEG-2 bitstreams coded at 720×480 resolution using frame storage buffers of size ¼×¼, or 180×120 pixels. Acceptable results have been achieved with this reduced size memory with inset picture displays of size 180×120, 210×140, and 240×160 pixels. With increased display size, the resulting image sequence appears fuzzier.

Thus, the P-I-P decoder circuit 200 illustrated in FIG. 2, provides for the downsampling of inset picture data prior to storage in the frame memory and then subsequent upsampling prior to display. In this manner, the memory size used to store the inset picture data does not have to correspond directly to the ultimate display size or number of pixels ultimately used to display the inset picture and can be considerably less than if a one to one correspondence was maintained between inset picture frame memory size and the actual inset picture display size.

What is claimed is:

1. A video processing circuit for processing a first set of video data encoded according to a first variable length encoding scheme, comprising:

a data selection circuit for selecting a subset of video data from the first set of video data, the subset of video data including less data than the first set of video data;

a variable length decoder coupled to the data selection circuit for decoding the selected subset of video data;

a variable length encoder circuit coupled to the variable length decoder for variable length encoding the selected subset of video data according to a second variable length encoding scheme; and a memory unit coupled to the variable length encoder circuit for storing the encoded subset of video data.

2. A video processing circuit for processing a first set of video data encoded according to a first variable length encoding scheme, comprising:

a variable length decoder for decoding at least a subset of the first set of video data;

a variable length encoder circuit coupled to the variable length decoder for variable length encoding the subset of video data according to a second variable length encoding scheme; and a memory unit coupled to the variable length encoder circuit for storing the encoded subset of video data; and a second variable length decoder circuit for variable length decoding, according to the second variable length encoding scheme, the encoded subset of video data stored in the memory unit to generate a variable length decoded subset of video data representing an inset picture.

3. The video processing circuit of claim 2, wherein the memory unit includes:

an inset picture coded data buffer portion for storing the encoded subset of video data and an inset picture frame memory portion;

and wherein the video processing circuit further comprises:

a downsampling circuit coupled to the second variable length decoder and the inset picture frame memory portion of the memory unit for downsampling the variable length decoded subset of video data to correspond to a video image smaller than the actual final display size of the inset picture; and upsampling means coupled to the inset picture frame memory portion of the memory unit for upsampling the downsampled subset of video data to correspond to the actual final display size of the inset picture.

4. The video processing circuit of claim 2, wherein the first variable length encoding scheme is MPEG-2 compliant, the second variable length encoding scheme is non-MPEG-2 compliant; and wherein the second variable length decoder circuit includes means for variable length decoding the encoded subset of video data according to the second variable length encoding scheme and for variable length decoding a second set of variable length encoded video data representing a main picture according to the first variable length encoding scheme.

5. The video processing circuit of claim 4, further comprising:

a combined MPEG-2 and non-MPEG-2 variable length code table coupled to the second variable length decoder circuit.

6. The video processing circuit of claim 2, further comprising:

means for time sharing the second variable length decoder to variable length decode the encoded subset of video data during a first time period and the second set of video data during a second time period, the sum of the first and second time periods being equal to or less than a period of time used to display the main picture.

7. The video processing circuit of claim 3, wherein the memory unit further includes a main picture coded data buffer portion for receiving and storing a second set of variable length encoded video data representing a main picture;

wherein the first variable length encoding scheme is MPEG-2 compliant, the second variable length encoding scheme is non-MPEG-2 compliant; and wherein the second variable length decoder circuit includes means for variable length decoding the encoded subset of video data according to the second variable length encoding scheme and for variable length decoding the second set of variable length encoded video data representing a main picture according to the first variable length encoding scheme.

8. The video processing circuit of claim 2, further comprising:

an MPEG-2 compliant variable length code table coupled to the first variable length decoder;

a first non-MPEG variable length code table coupled to the variable length encoder; and a second non-MPEG variable length code table coupled to the second variable length decoder.

9. A method of processing video data, comprising:

receiving first video data encoded according to a first data format;

selecting a subset of the video data to represent inset pictures, the first subset of video data including less video data than the received first video data;

variable length decoding the selected subset of video data encoded according to the first data format;

variable length encoding the variable length decoded subset of video data according to a second data format; and storing the variable length encoded subset of video data in a coded data buffer.

10. A method of processing video data, comprising:

receiving first video data encoded according to a first data format;

selecting a subset of the video data to represent inset pictures;

variable length decoding the selected subset of video data encoded according to the first data format;

variable length encoding the variable length decoded subset of video data according to a second data format;

storing the variable length encoded subset of video data in a coded data buffer; and syntax parsing and variable length decoding the stored encoded subset of video data in accordance with the second data format.

11. The method of claim 10, wherein the first data format is MPEG-2 compliant, and wherein the second data format always uses less than 64 DCT coefficients to represent a block of video data.

12. The method of claim 10, wherein the first data format is MPEG-2 compliant and wherein the second data format uses 16 or less DCT coefficients to represent a block of video data.

13. The method of claim 12, wherein the first video data represents data for use as an inset picture, and wherein the method further comprises the steps of:
receiving second video data representing a main picture;
decoding the second video data; and
combining the decoded subset of video data and decoded second video data to form a video signal representing an inset picture displayed within a main picture.

14. The method of claim 13, further comprising the steps of:

providing an inverse discrete cosine transform circuit for performing an IDCT operation;

operating the inverse discrete cosine transform circuit on a time shared basis to perform an IDCT operation on the variable length decoded subset of data and on the second video data.

15. A decoder for decoding digital main picture data representing a main picture and digital inset picture data representing an inset picture, comprising:

a main picture frame buffer for storing the main picture data;

a downsampling circuit for downsampling the inset picture data to correspond to a size smaller than the final display size of the inset picture;

an inset picture frame buffer for storing the downsampled inset picture data; and an upsampling circuit coupled to the inset picture frame buffer for upsampling the downsampled inset picture data to correspond to a the final inset picture display size.

16. The decoder of claim 15, wherein the main picture frame buffer and inset picture frame buffer are located within a single memory unit; and wherein the decoder further comprises:

a post-processor circuit coupled to the upsampling circuit and the main picture frame buffer for combining the upsampled inset picture data and the main picture data.

17. The decoder circuit of claim 15, further comprising:

an inverse discrete cosine transform circuit coupled to the downsampler and the main picture frame buffer including an 8×1 IDCT circuit for generating the IDCT of the main picture data and the inset picture data.

18. A method of processing a first set of video data encoded according to a first variable length encoding scheme, comprising the steps of:

selecting a subset of the first set of video data, the selected subset including less video data than the first video data;

performing a variable length decoding operation on the selected subset of video data;

performing a variable length encoding operation according to a second encoding scheme which is different than the first encoding scheme, on video data generated by the variable length decoding operation to generate a second set of encoded video data; and storing the second set of encoded video data in a memory device.

19. The method of claim 18, further comprising the step of:

performing a variable length decoding operation on the stored second set of encoded video data.

20. The method of claim 19, further comprising the step of:

displaying an image generated from the decoded video data produced by variable length decoding the second set of encoded video data.

21. The method of claim 20, further comprising the step of:

performing a data reduction operation on the decoded video data produced by variable length decoding the second set of encoded video data, prior to displaying the image.

22. The method of claim 21, wherein the displayed image is an inset picture.

* * * * *